United States Patent [19]

Miihkinen

[11] Patent Number: 4,748,736
[45] Date of Patent: Jun. 7, 1988

[54] METHOD FOR MANUFACTURING A PRESS ROLL

[75] Inventor: Veijo Miihkinen, Jyväskylä, Finland

[73] Assignee: Valmet Oy, Finland

[21] Appl. No.: 894,925

[22] Filed: Aug. 8, 1986

Related U.S. Application Data

[63] Continuation-in-part of Ser. No. 816,628, Jan. 6, 1986.

[30] Foreign Application Priority Data

Sep. 16, 1985 [FI] Finland .................. 853544

[51] Int. Cl.⁴ ............................. B23K 9/04
[52] U.S. Cl. .................. 29/527.2; 29/132; 219/76.1
[58] Field of Search .......... 29/132, 527.2; 162/357; 148/127; 428/551; 219/76.1, 76.14, 76.16; 228/119

[56] References Cited

U.S. PATENT DOCUMENTS

| | | | |
|---|---|---|---|
| 3,156,968 | 11/1964 | White, Jr. ............... | 219/76.14 X |
| 3,513,288 | 5/1970 | Arnoldy .................. | 219/76.14 X |
| 3,526,939 | 9/1970 | Nikkanen ................ | 29/148.4 |
| 3,648,140 | 3/1972 | Majek et al. ............ | 219/76.14 X |
| 3,800,381 | 4/1974 | Brafford .................. | 29/132 |
| 4,159,301 | 6/1979 | Buser et al. ............. | 264/331 |
| 4,391,879 | 7/1983 | Fabian et al. ........... | 29/132 X |
| 4,404,450 | 9/1983 | Weldon ................... | 219/76.14 X |
| 4,435,893 | 3/1984 | Sims ....................... | 219/76.14 X |
| 4,484,959 | 11/1984 | Boucher et al. .......... | 29/132 X |
| 4,493,963 | 1/1985 | Arnoldy .................. | 219/76.1 |
| 4,521,664 | 6/1985 | Miller ...................... | 219/76.14 |
| 4,566,938 | 1/1986 | Jenkins et al. ........... | 156/643 |
| 4,571,798 | 2/1986 | Adams ..................... | 29/130 |
| 4,610,073 | 9/1986 | Maliszewski ............. | 29/132 X |

FOREIGN PATENT DOCUMENTS 0208897 1/1987 European Pat. Off. .

Primary Examiner—Mark Rosenbaum
Assistant Examiner—Irene Cuda
Attorney, Agent, or Firm—Steinberg & Raskin

[57] ABSTRACT

A press roll for a paper machine includes a cylindrical mantle formed of metal providing the roll with mechanical strength. A coating is provided on the roll mantle, the coating being partially or entirely metallic. The metallic coating is preferably formed of stainless steel containing chromium and provides for a controlled detachment of the paper web from the roll coating as well as durability, i.e., ability to withstand various strains to which the roll surface is subjected. In addition to the metallic component, the roll coating may also include a component or components of ceramic material. A method for manufacturing such a press roll includes the application of the coating to the surface of the cylindrical mantle by band welding wherein the welding admixture band is preferably in the range of between about 30 to 150 mm wide and about 0.5 mm thick. In the band welding, a ceramic admixture may be included in the welding band or, alternatively, the ceramic admixture may be alloyed into the molten weld by means of a shield powder.

10 Claims, 1 Drawing Sheet

METHOD FOR MANUFACTURING A PRESS ROLL

BACKGROUND OF THE INVENTION

This application is a continuation-in-part of U.S. application Ser. No. 816,628 filed Jan. 6, 1986.

The present invention relates to a press roll for use in paper machines having ends, axle journals and a cylindrical mantle formed of metallic material which provides the roll with mechanical strength.

The invention also relates to a method for manufacturing the press roll.

Rock rolls used in paper machine press sections are formed of granite for the reason that the surface properties of granite provide for a controlled detachment of the paper web from the surface of the rock roll. Granite also provides good resistance to the abrasive effect of a doctor.

However, granite does have some drawbacks. Being a natural material, its properties tend to vary which may result in non-uniform, and in certain cases even inadequate detachment of the web from the surface of the roll. Internal flaws may exist in the granite material which would result in a tendency for the roll to crack. Indeed, this tendency to crack constitutes the most serious problem in applications where the rock roll is subjected to high linear loads and high temperatures, such as where it is attempted to increase the dry solid content of the paper in the press section of the paper machine. It is advantageous to increase the dry solid content of a web in the press section of a paper machine since this is significantly more economical than dewatering a web by evaporation. Moreover, a web which has been dewatered to a greater extent in the paper machine is stronger and therefore permits the running speed of the paper machine to be increased, and the most natural way of increasing the dry solid content of the web is to increase the linear load and the temperature at the press section. However, this has not been possible to the extent desired using conventional rock rolls. Another disadvantage of conventional rock rolls is that they are quite heavy and therefore increase the tendency for the paper machine to vibrate during operation. The great weight of rock rolls also requires more extensive frame constructions for the paper machine.

Conventional rock rolls generally comprise a relatively thick cylindrical mantle of granite inside of which a steel shaft is situated. Tensioning flanges are attached at the ends of the steel shaft by means of which the granite mantle is compressed to eliminate the possibility of tensile loads acting on the mantle under any loading condition. Such construction is relatively complicated.

Attempts have been made to provide synthetic rock rolls. However, to the present, certain properties of such synthetic rock rolls have been inadequate. Generally, such rolls are provided with a polymer surface to which a rock powder, such as quartz sand, has been added to hard rubber or polyurethane. These prior art synthetic rock rolls have the drawback that the paper web has the tendency to adhere excessively to the surface of the roll and, moreover, the roll has poor strength properties. In particular, the use of such polymer-surfaced rolls at elevated temperatures, such as above 80° C., has not been possible.

A press roll is disclosed in applicant's U.S. application Ser. No. 816,628 filed Jan. 6, 1986 wherein to the surface of the cylindrical mantle a surface layer is applied comprising a mixture of a metallic powder and an inorganic substance. The function of the metallic material is to act as a binder agent and to increase the toughness of the roll coating. The function of the inorganic material is to produce a wear-resistant surface of suitable surface energy. In this connection, the surface energy of the roll surface must be within certain limits in order to control the detachment of the paper web from the surface of the press roll. The surface energy of granite, whose surface properties provide desirable controlled detacment of the paper web from the roll surface, will vary as a function of the roughness of the surface so that a granite roll operates in a desired manner when the surface energy is within the range of between about 41 to 50 mJ/m². Besides the material from which the surface layer of the roll is made, another factor which affects the surface energy is the ratio of hydrophilic components in the surface to the hydrophobic components in the surface. By controlling the ratio of hydrophilic to hydrophobic components in the surface layer, the surface energy of the roll can be controlled so that it remains within certain suitable limits. Thus, hydrophilic and hydrophobic components exist in the paper web and in the surface of the roll disclosed in application Ser. No. 816,628 as well as in the surface layer of a roll constructed in accordance with the present invention. Since hydrophilic material repels hydrophobic material and vice versa, a controlled detachment of the web from the surface of the roll can be obtained by mixing hydrophilic and hydrophobic material in an appropriate ratio so that the surface energy of the press roll remains within the desired range.

SUMMARY OF THE INVENTION

Accordingly, one object of the present invention is to provide new and improved press rolls for paper machines and methods for manufacturing the same.

Another object of the present invention is to provide such new and improved press rolls and methods for manufacturing the same by means of which it is possible to use roll bodies manufactured by conventional casting techniques together with their ends and axle journals and wherein the roll body substantially provides the mechanical strength for the roll and wherein the surface properties of the roll as well as the durability of the roll surface are provided in a novel manner.

An important object of the present invention is to provide a new and improved press roll for paper machines and a method for manufacturing the same by means of which the detachment of the paper web from the roll surface is controlled and the resistance of the roll to temperature and to mechanical strains is improved relative to conventional constructions.

Briefly, in accordance with the present invention, these and other objects are attained by providing a press roll having a cylindrical mantle to which a coating is applied which is partially or entirely formed of metallic material chosen to achieve a controlled detachment of the paper web from the roll coating as well as resistance of the roll to various strains acting on the roll surface. In particular, a roll coating having a certain metallic component, preferably, stainless steel that contains chromium, the proportion of chromium in the metallic component being in the range of between 9 to 35%, provides suitable surface energy for the roll surface to achieve the desired controlled detachment of the web from the press roll surface. Thus, stainless steel containing an abundance of chromium is a hydrophilic substance since chromium increases the hydrophilic properties of the stainless steel. On the other hand, during the alloying of the chromium-stainless steel metallic component, wear-resistant chromium carbides are obtained which increase the resistance of the steel to corrosion. Thus, where chromium-containing stainless steel alloy is used for coating the roll mantle, a separate component of ceramic material in the form of chromium carbide is obtained during the alloying process so that not only is a desired surface energy achieved to provide controlled detachment of the web from the roll but, additionally, wear - and corrosion-resistance for the roll are also obtained by the separation of chromium carbide from the steel. A roll coated with a surface coating of the type described above is particularly advantageous for use in connection with the production of unbleached paper qualities.

A roll in accordance with the invention can be manufactured by several different techniques, such as those described in application Ser. No. 816,628.

A roll coating in accordance with the invention is prepared and applied to the roll mantle by methods described below. The roll body is manufactured in a conventional manner such, for example, as by casting or forming the same out of sheet metal whose ends are welded to each other. The roll body or mantle, including the ends and the axle journals, substantially provide the roll with necessary mechanical strength whereas the desired surface properties, namely surface energy, and mechanical strength and corrosion-resistance properties of the roll surface are provided by means of a roll coating in accordance with the invention.

A method in accordance with the invention is mainly characterized in that the cylindrical mantle is coated with a metallic component-containing coating by means of a band welding technique.

In a preferred embodiment of the method of the invention, a self-supporting admixture band having a width in the range of between about 30 to 150 mm, preferably about 60 mm, and a thickness of about 0.5 mm, is supplied at the roll at a speed greater than the welding speed. The welding admixture band is melted in a powder arc to yield a surface coating having a thickness of between about 3 to 5 mm. Although it is possible to weld more than one layer of the band over the roll mantle, usually only a single layer is sufficient.

Suitable metallic components for the roll coating are materials that are alloyed with large quantities of chromium. If it is desired to add a separate ceramic material component to the metallic component, e.g., where the ceramic material component is not produced as a result of the alloying of the metallic component, the roll coating can be produced by one of at least two different methods, namely:

1. The admixture band is prepared from a powder comprising a mixture of metallic and ceramic material components by rolling and sintering.
2. The desired chemical components are provided in a shield powder which is used to alloy the welded surface material which is in a molten state.

Suitable ceramic materials include, for example, $Al_2O_3$, $SiO_2$, $TiO_2$, $ZrO_2$, SiC, TiC, $Cr_3C_2$, WC, NbC, VC, and $Cr_7C_3$.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
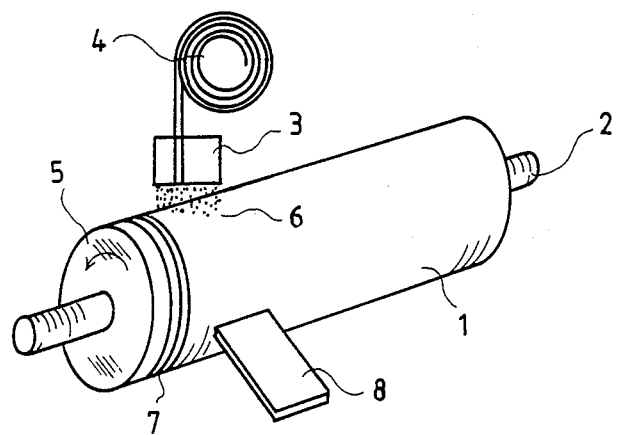
FIG. 1 is a schematic illustration showing a method of coating a press roll for a paper machine in accordance with the invention.

Referring now to the drawings wherein like reference characters designate identical or corresponding parts throughout the several views, and more particularly to FIG. 1, a roll body including a cylindrical mantle 1 formed of metallic material and axle journals 2 at its ends is illustrated. In accordance with the invention, a welding band formed partially or entirely of a metallic component is supplied by a welding head 3 onto the surface of mantle 1 as the roll rotates in the direction of arrow 5. The welding band 4 is supplied at a speed that is greater than the rate at which the band is welded onto the surface of the mantle 1.

The welding band 4 is melted in a powder arc, designated 6, so that a coating 7 is thereby applied to the surface of mantle 1. The surface of a roll mantle 1 may be pre-heated by means of a blower 8 prior to coating, if required.

In order to increase the resistance of the coating to mechanical strains and to improve the resistance of the coating to corrosion, a ceramic component may be added to the shield powder 6 whereupon the shield powder 6 becomes alloyed with the molten material of the welding band 4. Alternatively, a ceramic material may be included in the coating by preparing the admixture band 4 to include both metallic as well as ceramic components.

Figure 2:
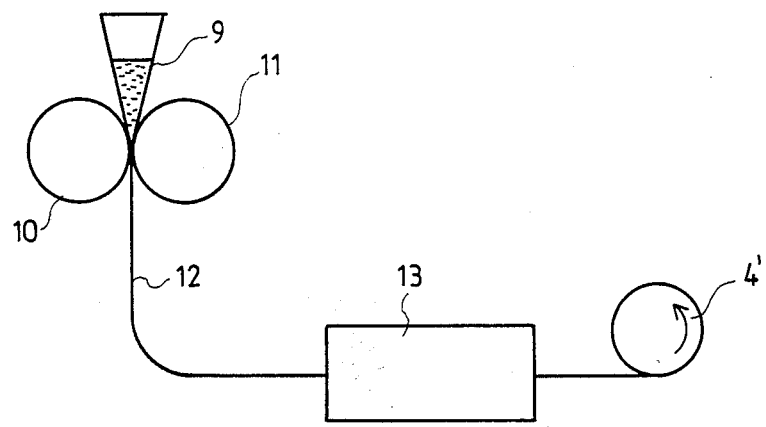
FIG. 2 is a schematic illustration showing the preparation of an admixture band for use in coating a press roll for a paper machine in accordance with the invention.

Referring to FIG. 2, the preparation of an admixture band 4' that contains both metallic and ceramic components is illustrated. A powder 9 comprising a mixture of the metallic and ceramic components is supplied at a suitable rate between two rolls 10 and 11 which compress the powder 9. For example, the powder 9 may comprise a mixture of chromium-containing stainless steel and a ceramic material such, for example, as one of $Al_2O_3$, $SiO_2$, $TiO_2$, $ZrO_2$, SiC, TiC, $Cr_3C_2$, WC, NbC, VC, and $Cr_7C_3$. The compressed powder 12 is then sintered at 13 to form the admixture band 4' which is reeled into a roll. Alternatively, the ceramic material may be separated from the metallic component itself, such as where chromium-alloyed stainless steel is used with chromium carbide being produced without the need for separately adding the ceramic material.

The band welding technique of the invention provides important advantages, such, for example, as a high coating speed, uniform penetration to only a relatively small extent, improved reproducibility and workability, and simple construction for the manufacturing equipment. Moreover, the method is suitable for coating in a workshop, is economical, provides good joint strength between the coating and the surface of the cylindrical mantle and requires relatively small investments for tooling up.

Obviously, numerous modifications and variations of the present invention are possible in light of the above teachings. It is therefore to be understood that within the scope of the claims appended hereto, the invention may be practiced otherwise than as specifically disclosed herein.

What is claimed is:

1. A method for manufacturing a press roll for paper machines, said press roll including a metallic cylindrical mantle having an outer surface, comprising the steps of:
   (a) selecting a material at least partially comprising a metallic component having a surface energy which corresponds to the surface energy of granite material;
   (b) preparing an elongated band including said material;
   (c) applying said band around said outer surface of said cylindrical mantle in band form and at the same time forming a coating on said cylindrical mantle from said band by welding; and
   (d) in the case where said material does not include a ceramic component, adding a ceramic component to said material during one of step (b) or step (c); whereby a press roll for a paper machine is obtained having a mantle providing said press roll with necessary strength and a coating on said mantle providing for a controlled detachment of a paper web from the roll and which substantially provides the roll surface with resistance to mechanical and thermal strains.

2. The method of claim 1 wherein said material includes a ceramic component and, in particular, comprises chromium-containing stainless steel alloy having a chromium carbide component constituting said ceramic component.

3. The method of claim 1 wherein said welding band is applied to said outer surface of said roll mantle at a speed greater than the band welding speed.

4. The method of claim 1 wherein said material does not include a ceramic component, and wherein said ceramic component is added to said material during the preparation of the elongated band by the steps of:
   preparing a powder mixture including a powder component of said metallic material and a powder ceramic component;
   compressing said powder mixture; and
   sintering said compressed powder mixture to obtain said elongated band.

5. The method of claim 4 wherein said ceramic component is chosen from the group consisting of $Al_2O_3$, $SiO_2$, $TiO_2$, $ZrO_2$, SiC, TiC, $Cr_3C_2$, WC, NbC, VC, and $Cr_7C_3$.

6. The method of claim 1 wherein said material does not include a ceramic component, and wherein said ceramic component is added to said material during the application of said band around said outer surface of said cylindrical mantle and the formation of a coating on said cylindrical mantle from said band by arc-welding, by the steps of:
   performing said welding in the presence of a shield powder;
   adding a powder of ceramic component to said shield powder; and
   alloying said shield powder including said ceramic component to said material of said band while said band is in a molten state during said welding.

7. The method of claim 6 wherein said ceramic component is chosen from the group consisting of $Al_2O_3$, $SiO_2$, $TiO_2$, $ZrO_2$, SiC, TiC, $Cr_3C_2$, WC, NbC, VC, and $Cr_7C_3$.

8. The method of claim 1 wherein said welding band has a width in the range of between about 30 to 150 mm.

9. The method of claim 8 wherein said welding band has a thickness of about 0.5 mm.

10. The method of claim 1, wherein the welding carried out in step (c) is arc-welding.

* * * * *